J. Stever,

Burnishing Machine.

No. 834. Reissued Oct. 11, 1859.

Witnesses:

LeRoy Mile

S. F. Rogers

Inventor:

J. Stever

N. PETERS, PHOTO-LITHOGRAPHER, WASHINGTON, D. C.

UNITED STATES PATENT OFFICE.

JEREMIAH STEVER, OF BRISTOL, CONNECTICUT.

IMPROVEMENT IN MACHINES FOR BURNISHING METALS.

Specification forming part of Letters Patent No. 12,799, dated May 1, 1855; Reissue No. 834, dated October 11, 1859.

*To all whom it may concern:*

Be it known that I, JEREMIAH STEVER, of Bristol, in the county of Hartford and State of Connecticut, have invented a new and useful Improvement or Organization of Machine for Burnishing Silver, Plated, and other Metallic Ware, comprising spoons, knives, forks, and other similar articles which have a convex, concave, or beveling surface; and I do hereby declare that the following is a full, clear, and exact description of the same, reference being had to the accompanying drawings, forming a part of this specification, in which—

Figure 1:
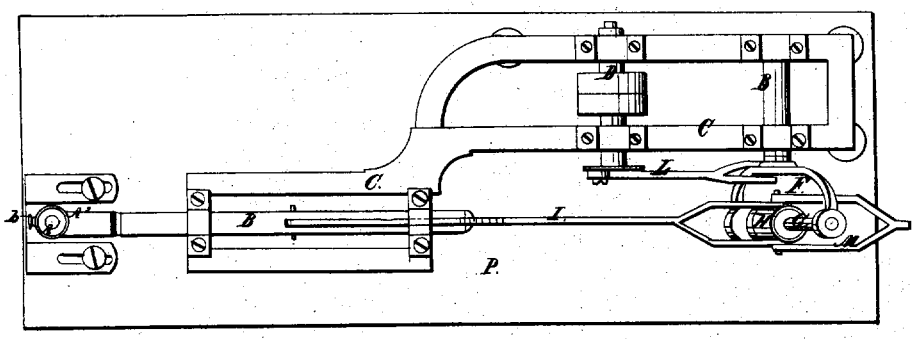
Figure 2:
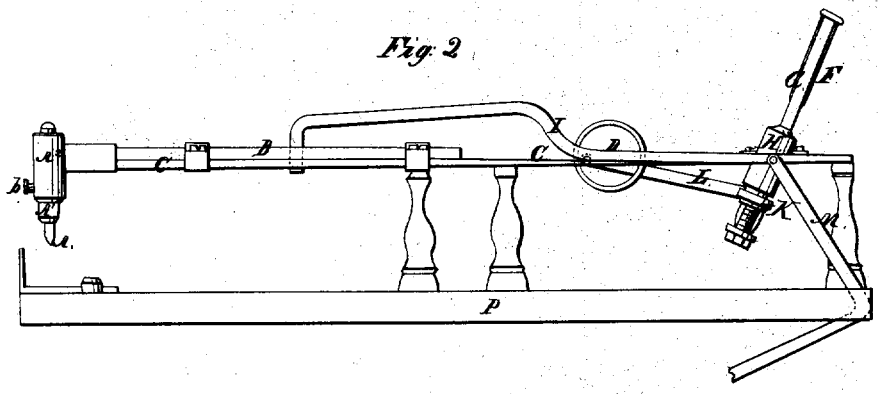
Figure 4:
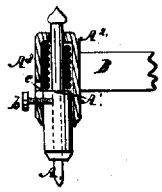
Figure 3:
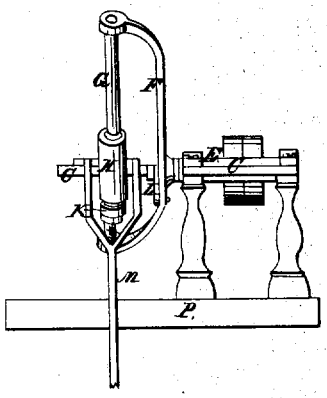

Figure 1 is a top view of my machine; Fig. 2, a side view; Fig. 3, an end view, and Fig. 4 a vertical section of the burnishing-tool.

Similar letters of reference in each of the several figures indicate corresponding parts.

The invention which I have developed is rendering practicable the burnishing of silver, plated, and other metallic ware—such as spoons, knives, and forks, or other similar articles having a concave, convex, or bevel surface—by an organized machine requiring no other attention than being kept in proper order, adjusted to suit the article about being burnished, set in motion, and having the spoons, forks, or knives properly introduced to it, successively, as hereinafter set forth.

To enable others skilled in the art to make and use my invention, I will proceed to describe its construction and operation.

A denotes a burnishing-tool. This tool is fitted in a spindle, A′, so as to be adjusted up and down, a set-screw, *b*, holding it firmly. The spindle A′ is arranged to play with the tool A in a socket, $A^2$, against a spiral spring, $A^3$, the movement of the spindle up and down being allowed for by the slot *c*, in which the set-screw *b* plays freely. By having the burnishing-tool arranged below a spring it is allowed a chance to rise and fall in moving over an irregular or concave, convex, or beveled surface, and thus perfectly burnish every portion of the article being operated upon, notwithstanding it has only a horizontal movement imparted to it. The socket $A^2$ is fixed to a horizontal slide-bar, B, supported by a frame, C, which carries two horizontal shafts, D E, the latter of which is a rocker-shaft, while the former is the driving-shaft of the machine. The said rocker-shaft has a bow or stirrup, F, affixed to one end of it and formed of two curved arms extending in opposite directions from the axis of the shaft, and united together at their outer end by a rod, G, on which is placed a slider, H, being arranged so that when the slider is depressed far enough on the rod G they may be brought in line with the axis of the rocker-shaft E, in which position the slider is sustained upon a screw-nut, K, screwed upon the rod G. The stirrup is connected to the driving-shaft by means of a rod, L, which is so applied to the driving-shaft and the stirrup as to cause the shaft E to have a rocking or reciprocating rotary motion produced by a continuous rotary motion of the driving-shaft. The slider H is raised or lowered upon the rod G by means of a fork, M, which, if necessary, may be made to extend upward from a treadle placed under the machine.

By means of the mechanism above described the burnisher may not only have a reciprocating movement imparted to it, but such movement may be either arrested or regulated, as occasion may require, while the rocker-shaft is in movement.

In burnishing metallic articles, and particularly those that are ornamented or have concave, convex, or bevel surfaces, it often becomes necessary to employ a very short movement of the burnishing-tool, and at the same time to impart to the tool a very rapid movement, and during said movement the tool must have perfect freedom to rise and fall to fit into the concavity, follow the convexity, or accommodate itself to the bevel of the surface being burnished. With my machine all this can be effected, as the spring $A^3$ allows the tool to rise and fall and modifies its action or friction, while the slider and its connections serve for graduating the extent of its reciprocating movement, or entirely arresting it without stopping that part of the machine which actuates the tool when the slider is adjusted to any other than the arresting-point.

The immense importance of a burnishing-machine made to operate in the above-described manner can only be estimated by persons skilled in the art of burnishing metallic articles—such as spoons, forks, and knives—and especially when the same are covered with ornaments in relief or sunk below their surfaces.

In operating with my machine the articles to be burnished are introduced successively under the burnishing-tool and subjected to the action of the same until every point is burnished, it not being necessary to continually wabble the spoon or other article in order to have the burnishing-tool come in contact with every part of its surface, but simply to slip it laterally to the right or left, the spring allowing the tool to conform to the convex, concave, or bevel surface, as the necessity of the case may require.

I do not claim burnishing by machinery articles of an equal thickness at every point and flat on their surfaces; but What I do claim as my invention, and desire to secure by Letters Patent, is—

The burnishing of silver, plated, and other metallic ware—such as spoons, knives, and forks, or other similar articles which have a concave, convex, or bevel surface—by an organized machine requiring no other attention than being kept in proper order, adjusted to suit the article about being burnished, set in motion, and having the articles properly introduced to it successively, substantially in the manner herein set forth.

J. STEVER.

Witnesses:
GOODWIN Y. ATLEE,
H. AMIDON.